United States Patent [19]
Choi et al.

[11] Patent Number: 5,701,754
[45] Date of Patent: Dec. 30, 1997

[54] AUTOMOBILE REFRIGERATOR

[76] Inventors: Young Tai Choi, 4 Felter Hill Rd., Monroe, N.Y. 10950; Yeung H. Huh, 53 Plesant Ridge Dr., Poughkeepsie, N.Y. 12603

[21] Appl. No.: 536,388

[22] Filed: Sep. 29, 1995

[51] Int. Cl.$^6$ ............................................. B60H 1/32
[52] U.S. Cl. .............................. 62/244; 296/37.12
[58] Field of Search ................ 62/239, 244; 296/37.12

[56] References Cited

U.S. PATENT DOCUMENTS

| | | | |
|---|---|---|---|
| 2,287,404 | 6/1942 | Zerk | 296/37.12 |
| 4,398,317 | 8/1983 | Schubring | 296/37.12 X |
| 4,483,151 | 11/1984 | Fujioka et al. | 62/244 X |

FOREIGN PATENT DOCUMENTS

| | | | |
|---|---|---|---|
| 60-56644 | 4/1985 | Japan | 62/244 |
| 60-56645 | 4/1985 | Japan | 62/244 |

*Primary Examiner*—Henry A. Bennett
*Assistant Examiner*—Susanne C. Tinker

[57] ABSTRACT

A new and improved automobile refrigerator comprising, in combination, an automobile dashboard having an exterior surface with a recess formed therein. A door is positioned over the recess to selectively open and close the recess. A hinge couples the lower edge of the door with the lower edge of the recess to allow the pivoting of the door to provide or prohibit access to the space within the recess interior of the dashboard. A box in the recess behind the door has upper and lower walls, side walls and a rear wall in the box-like configuration with an opening in the front of the walls terminating at the dashboard. Thermal insulation is located along all of the walls including the front door to abate the flow of thermal energy to and from the space within the box. A rectangular gasket is formed on the interior surface of the door adapted to contact the dashboard adjacent to the periphery of the opening. Flexible connectors have upper ends coupled to the box at upper extents thereof. The connectors have lower ends coupled to the interior surface of the door interior of the gasket to preclude excessive movement of the door when opened to lower than the horizontal.

1 Claim, 3 Drawing Sheets

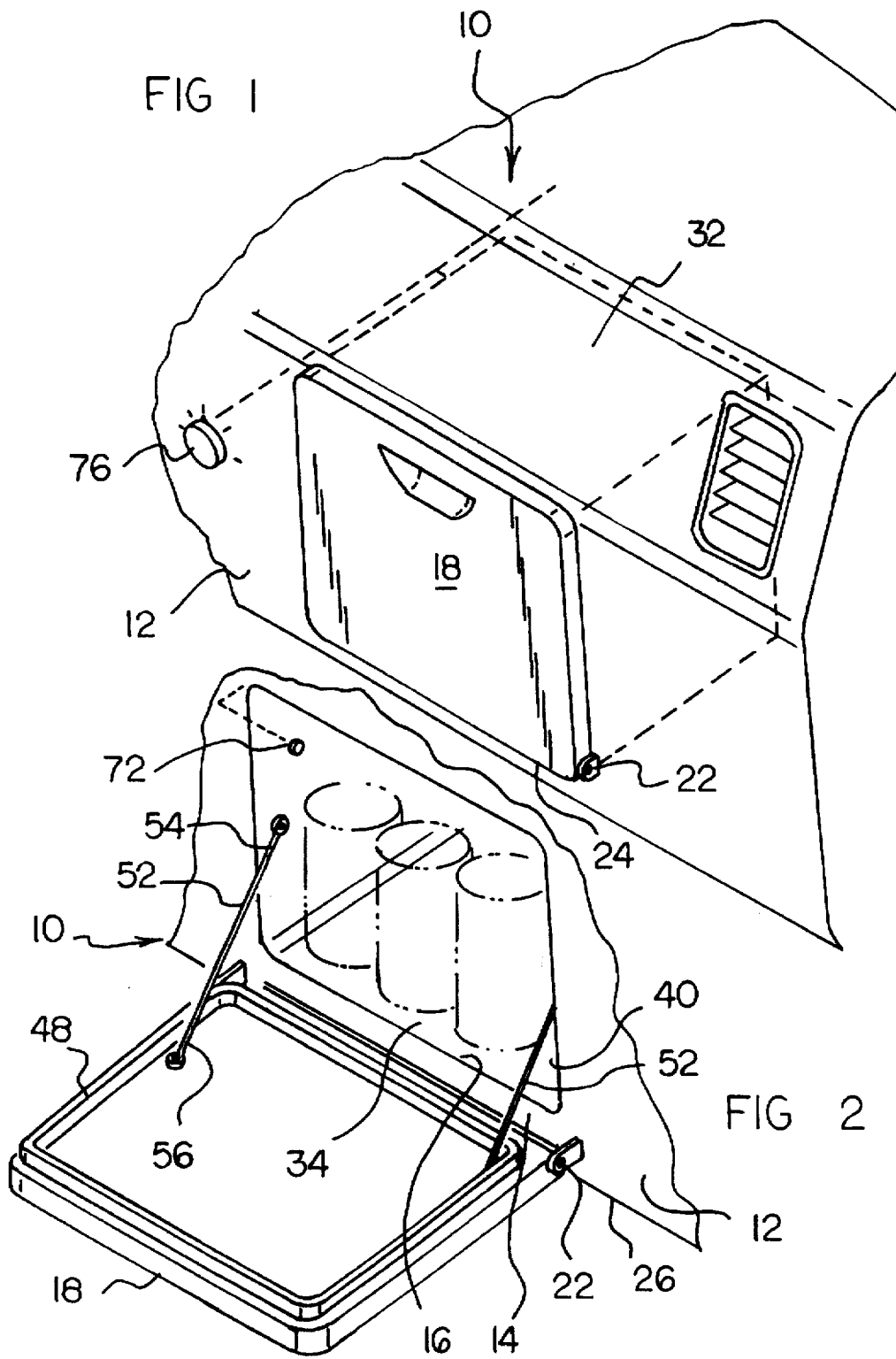

AUTOMOBILE REFRIGERATOR

BACKGROUND OF THE INVENTION

1. Field of the Invention

The present invention relates to a new and improved automobile refrigerator and, more particularly, pertains to cooling containers of beverages within a refrigerator located in the dashboard of an automobile.

2. Description of the Prior Art

The use of refrigerators of various designs and configurations is known in the prior art. More specifically, refrigerators of various designs and configurations heretofore devised and utilized for the purpose of cooling a wide variety of objects through various methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of refrigerators of various designs and configurations. By way of example, U.S. Pat. No. 3,505,830 to Koerner discloses a box refrigerated by vehicle air conditioning.

U.S. Pat. No. 4,545,213 to Fuiwara et al., discloses a refrigerator for vehicle.

U.S. Pat. No. 4,637,220 to Sakano discloses a refrigeration system for both vehicle air conditioner and refrigerator.

U.S. Pat. No. 5,265,435 to Richardson discloses a vehicle refrigeration system.

Lastly, U.S. Pat. No. 5,335,514 to Hennessee et al., discloses a vehicle air conditioner refrigeration, automatic variable set point evaporator system therefor.

In this respect, the automobile refrigerator according to the present invention substantially departs from the conventional concepts and designs of the prior art, and in doing so provides an apparatus primarily developed for the purpose of cooling containers of beverages within a refrigerator located in the dashboard of an automobile.

Therefore, it can be appreciated that there exists a continuing need for a new and improved automobile refrigerator which can be used for cooling containers of beverages within a refrigerator located in the dashboard of an automobile. In this regard, the present invention substantially fulfills this need.

SUMMARY OF THE INVENTION

In view of the foregoing disadvantages inherent in the known types of refrigerators of various designs and configurations now present in the prior art, the present invention provides a new and improved automobile refrigerator. As such, the general purpose of the present invention, which will be described subsequently in greater detail, is to provide a new and improved automobile refrigerator and methods which have all the advantages of the prior art and none of the disadvantages.

To attain this, the present invention essentially comprises a new and improved automobile refrigerator comprising, in combination, an automobile dashboard having an exterior surface with a recess formed therein. A door is positioned over the recess to selectively open and close the recess. A hinge couples the lower edge of the door with the lower edge of the recess to allow the pivoting of the door to provide or prohibit access to the space within the recess interior of the dashboard. A box in the recess behind the door has upper and lower walls, side walls and a rear wall in the box-like configuration with an opening in the front of the walls terminating at the dashboard. Thermal insulation is located along all of the walls including the front door to abate the flow of thermal energy to and from the space within the box. A rectangular gasket is formed on the interior surface of the door adapted to contact the dashboard adjacent to the periphery of the opening. Flexible connectors have upper ends coupled to the box at upper extents thereof. The connectors have lower ends coupled to the interior surface of the door interior of the gasket to preclude excessive movement of the door when opened to lower than the horizontal. A serpentine link of tubing with thermally conductive fins is secured to the box interior of the insulation on the rear wall to provide coolness to the chamber. The tubing has an inlet for receipt of a cooling fluid from the evaporator and an outlet for the return of cooling fluid to the evaporator. The tubing has a valve to stop and start the flow of fluid through the tubing. A sensor is located in the box to sense the temperature therein and to turn on the valve to affect the flow of cooling fluid to the tubing with adjusting means for varying the temperature within the box. The switch is adapted to turn on the compressor of the air conditioner on its own even if the air-conditioner of the vehicle was not previously running.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automobile refrigerator which has all the advantages of the prior art refrigerators of various designs and configurations and none of the disadvantages.

It is another object of the present invention to provide a new and improved automobile refrigerator which may be easily and efficiently manufactured and marketed.

It is a further object of the present invention to provide a new and improved automobile refrigerator which is of a durable and reliable construction.

An even further object of the present invention is to provide a new and improved automobile refrigerator which is susceptible of a low cost of manufacture with regard to both materials and labor, and which accordingly is then susceptible of low prices of sale to the consuming public, thereby making such a automobile refrigerator economically available to the buying public.

Still yet another object of the present invention is to provide a new and improved automobile refrigerator which provides in the apparatuses and methods of the prior art some of the advantages thereof, while simultaneously overcoming some of the disadvantages normally associated therewith.

Even still another object of the present invention is to cool containers of beverages within a refrigerator located in the dashboard of an automobile.

Lastly, it is an object of the present invention to provide a new and improved automobile refrigerator comprising, in combination, an automobile dashboard having an exterior surface with a recess formed therein. A door is positioned over the recess to selectively open and close the recess. A hinge couples the lower edge of the door with the lower edge of the recess to allow the pivoting of the door to provide or prohibit access to the space within the recess interior of the dashboard. A box in the recess behind the door has upper and lower walls, side walls and a rear wall in the box-like configuration with an opening in the front of the walls terminating at the dashboard. Thermal insulation is located along all of the walls including the front door to abate the flow of thermal energy to and from the space within the box. A rectangular gasket is formed on the interior surface of the door adapted to contact the dashboard adjacent to the periphery of the opening. Flexible connectors have upper ends coupled to the box at upper extents thereof. The connectors have lower ends coupled to the interior surface of the door interior of the gasket to preclude excessive movement of the door when opened to lower than the horizontal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the preferred embodiment of the automobile refrigerator constructed in accordance with the principles of the present invention.

FIG. 2 is a perspective view of a portion of the device shown in FIG. 1 but with the door in an opened orientation.

The same reference numerals refer to the same parts throughout the various Figures.

DESCRIPTION OF THE PREFERRED EMBODIMENT

Figure 3:
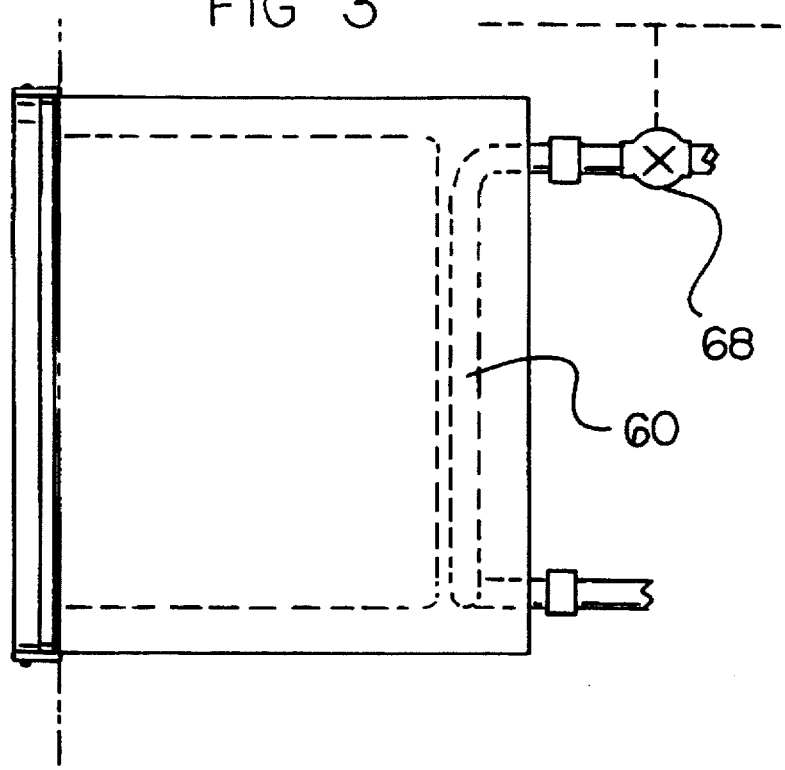
FIG. 3 is a side elevational view of the apparatus showing FIG. 1.
Figure 4:
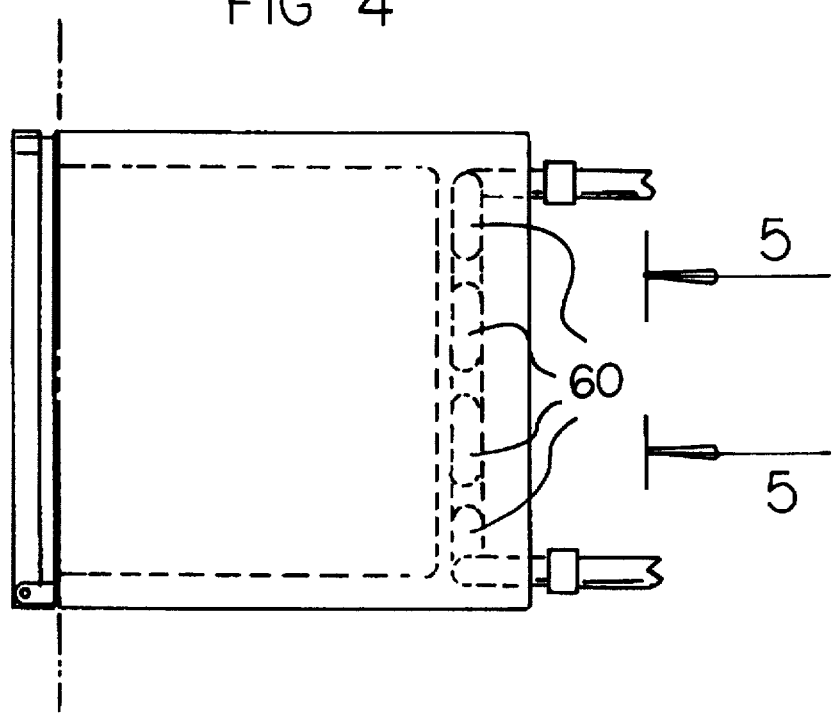
FIG. 4 is a top elevational view of the apparatus shown in FIG. 1.
Figure 5:
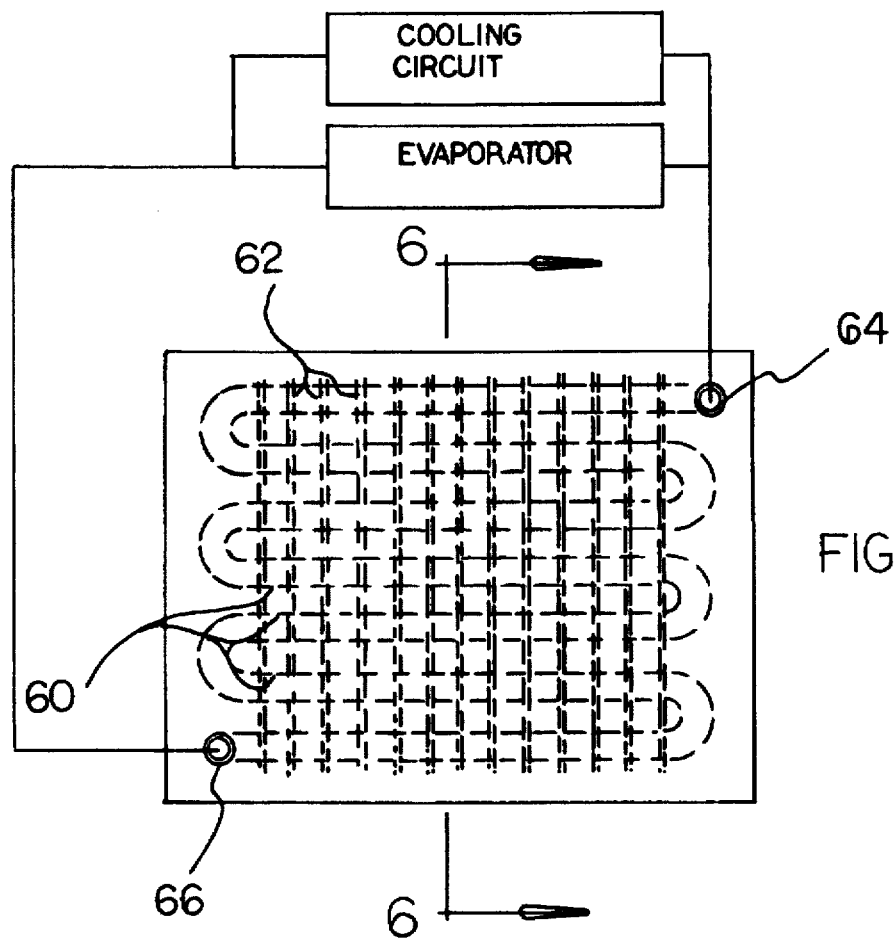
FIG. 5 is a rear elevational view of the apparatus shown in the prior Figures.
Figure 6:
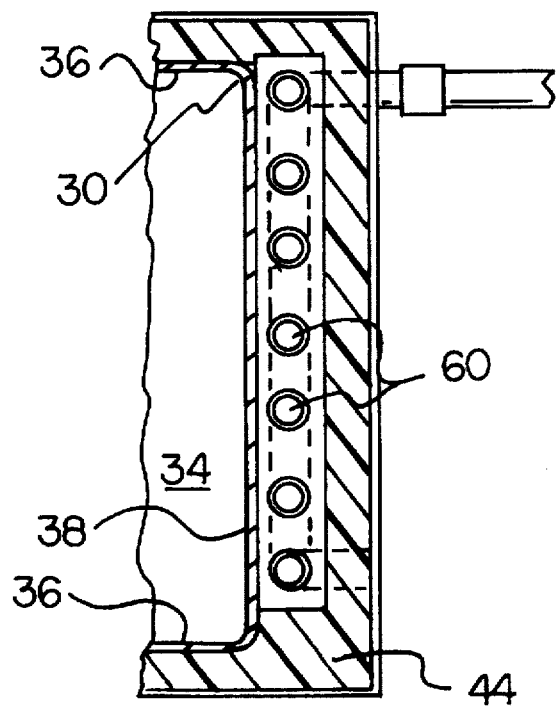
FIG. 6 is a cross sectional view taken along line 6—6 of FIG. 5.

With reference now to the drawings, and in particular to FIGS. 1 thereof, the preferred embodiment of the new and improved automobile refrigerator embodying the principles and concepts of the present invention and generally designated by the reference numeral 10 will be described.

The present invention, the new and improved automobile refrigerator is a system 10 comprised of a plurality of components. Such components, in their broadest context, include a dashboard, a door, a hinge, a box, thermal insulation, a gasket, connectors, tubing, and a sensor. Each of the individual components is specifically configured and correlated one with respect to the other so as to attain the desired objectives.

More specifically, the present invention is a system 10. It is adapted to be used in association with an automobile dashboard 12. The dashboard is of the type having an exterior surface 14 with a recess 16 formed therein. In association with the recess in the dashboard, there is provided a door 18. The door is positioned over the recess to selectively open and close the recess.

In association with the recess and door, a hinge 22 is formed. The hinge pivotally couples the door at its lower edge 24 with the lower edge 26 of the recess. This allows for the pivoting of the door. As such, access is provided or prohibited to the space within the recess interior of the dashboard. It is in this base that the cans of beverage or other items, are stored for cooling.

Within the recess is a box 30. The box is in the recess behind the door. It has an upper wall 32 and a lower wall 34. It also has parallel side walls 36 coupled to the upper and lower walls at their edges. In association therewith, there is provided a rear wall 38 with its peripheral edges secured to the interior edges of the upper, lower and side walls. As such, the walls form a box-like configuration. Such box-like configuration includes an opening 40 in the front edges of the walls which terminates at the dashboard.

To increase the efficiency of the cooling within the box there is provided thermal insulation 44. Such insulation is located along the interior surface of all the walls including the interior face of the front door. The purpose of the insulation is to abate the undesired flow of thermal energy to and from the space within the box.

To further abate the flow of thermal energy to and from the space within the box, a rectangular gasket 48 is provided. Such gasket is formed on the interior surface of the door adjacent to its periphery. It is adapted to contact the dashboard adjacent to the periphery of the opening.

Coupling the box and the door are a pair of flexible connectors 52. Such connectors have upper ends 54 permanently coupled to the box at the upper extents thereof near the exterior portion. The connectors each also have lower ends 56. Such lower ends are permanently coupled to the interior surface of the door interior of the gasket adjacent to the upper end thereof remote from the hinge. The function of the connectors is to preclude excess movement of the door when pivoted open to lower than the horizontal.

The removal of heat energy and the cooling contents within the box are effected through a serpentine length tubing 60. Such tubing is supported by thermally conductive fins 62. Such fins are secured on their interior faces to the box interior of the insulation on the rear wall. The tubing, in association with the fins, is to provide coolness to the chamber. The tubing is formed with an inlet 64. Such inlet is for the receipt of cooling fluids from a conventional evaporator of an automobile having an air conditioning system. The tubing also has an outlet 66. The outlet is for the return of the cooling fluid in the tube to the evaporator. The tubing also has a valve 68 to stop and start the flow of fluid through the tubing.

Lastly, a sensor 72 is provided within the box. Such sensor is to turn on and off to effect the flow or stoppage of cooling fluid to the tubing. In association therewith, operator controlled adjusting means 76 are provided for varying the temperature sensed within the box. The switch 76 is adapted to turn on the valve when the air conditioner of the vehicle is running and, to turn on the compressor of the air conditioner on its own even if the air conditioner was not previously running.

The invention is a small, integrated automobile refrigerator that utilizes the vehicle's existing air conditioning compressor to supply the necessary refrigeration.

It consists of the refrigerator housing, heat transfer coils, and a temperature control unit. The refrigerator housing is sized to suit the application, and should fit into the space occupied by the glove compartment in most vehicles. It has a capacity of 6 beverage cans. The transfer coils are an integral part of the design and are used to dissipate heat energy from the interior of the refrigerator. Utilizing the existing compressor should save valuable interior space and simplify the installation. The control unit both senses the temperature of the unit's interior and activates the air conditioner circuits. This is accomplished independently of normal air condition operation.

In use, the invention is simply set to the desired temperature. No further intervention is required. Whenever the vehicle is operated, the air conditioning compressor is used to keep its contents cool. The well insulated design should keep a beverage cool even while shopping or stopping for a few hours much like an ordinary cooler but without the need for ice. The insulation should also minimize the amount of time the compressor is operated.

It helps people to keep their favorite beverages cool in an automobile environment. The utilization of the existing compressor and its related components simplifies the overall installation. Anyone who needs or desires to keep food and drinks fool will appreciate the advantages of this system.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved automobile refrigerator comprising, in combination:

an automobile dashboard having an exterior surface with a recess formed therein;

a door positioned over the recess to selectively open and close the recess;

a hinge coupling a lower edge of the door with the lower edge of the recess to allow the pivoting of the door to provide or prohibit access to a space within the recess of the dashboard;

a box in the recess behind the door having upper and lower walls, side walls and a rear wall in a box-like configuration with an opening in the front of the walls terminating at the dashboard, wherein the box is adapted to hold six beverage containers;

thermal insulation located along all of the walls including the door to abate the flow of thermal energy to and from the space within the box;

a rectangular gasket formed on the interior surface of the door adapted to contact the dashboard adjacent to the periphery of the opening;

flexible connectors having upper ends coupled to the box at upper extents thereof, the connectors having lower ends coupled to the interior surface of the door interior of the gasket to preclude excessive movement of the door when opened to lower than the horizontal;

a serpentine link of tubing with thermally conductive fins secured to the box interior of the insulation on the rear wall of the box to provide coolness to the box, the tubing having an inlet for receipt of a cooling fluid from an evaporator of the automobile and an outlet for the return of cooling fluid to the evaporator of the automobile, the tubing having a valve to stop and start the flow of fluid through the tubing; and a sensor in the box to sense the temperature therein and to turn on the valve to effect the flow of cooling fluid to the tubing with operator-controlled adjusting switch for varying the temperature within the box, the switch adapted to turn on the valve when an air conditioner of the automobile is running and further adapted to turn on a compressor of the automobile when an air-conditioner of the automobile was not previously running.

* * * * *